United States Patent [19]
Angel

[11] Patent Number: 5,253,965
[45] Date of Patent: Oct. 19, 1993

[54] PIERCING FASTENER WITH ADHESIVE

[75] Inventor: Jeffrey R. Angel, Oxford, Mich.

[73] Assignee: Progressive Tool & Industries Co., Southfield, Mich.

[21] Appl. No.: 867,481

[22] Filed: Apr. 13, 1992

[51] Int. Cl.⁵ .................. F16B 39/00; F16B 39/02
[52] U.S. Cl. ......................... 411/82; 411/258; 411/456; 411/930; 29/525.1
[58] Field of Search ............... 411/82, 258, 446, 450, 411/452, 456, 922, 903, 930, 180, 451; 405/259.5, 259.6; 403/408.1; 29/525.1

[56] References Cited

U.S. PATENT DOCUMENTS

| | | | |
|---|---|---|---|
| 1,918,936 | 7/1933 | Shearman . | |
| 2,168,854 | 8/1939 | Agnew | 411/446 |
| 2,678,074 | 5/1954 | Adams | 411/180 |
| 3,897,713 | 8/1975 | Gugle | 411/930 |
| 4,313,697 | 2/1982 | Rozanc | 405/259.6 |
| 4,362,450 | 12/1982 | Hasegawa et al. | 411/903 X |
| 4,551,189 | 11/1985 | Peterson . | |
| 4,636,124 | 1/1987 | Gugle et al. . | |
| 4,712,957 | 12/1987 | Edwards et al. . | |
| 4,728,238 | 3/1988 | Chisholm et al. . | |
| 4,964,772 | 10/1990 | Es | 411/82 |
| 5,000,636 | 3/1991 | Wallace | 411/82 |

FOREIGN PATENT DOCUMENTS 847851  10/1939  France .................. 411/451

Primary Examiner—Neill R. Wilson
Attorney, Agent, or Firm—Remy J. VanOphem

[57] ABSTRACT

A fastener suitable for joining two or more plastic or metal panels together under automated manufacturing conditions. The fastener has a piercing end for forming its own passage through the panels so as to avoid the need for a pre-drilled hole. Disposed near the piercing end are one or more rigid barbs which extend obliquely from the shank toward the head of the fastener. The barbs create an interference with the adjacent panel to secure the panels. The fastener further incorporates an adhesive strip which serves to adhere the fastener to the panels in a manner that prevents both rotation and axial displacement of the fastener relative to the panels. The fastener is particularly adapted for permanently joining two or more panels where access to both sides of the joined panels is either impracticable or undesirable, such as when a body panel of an automobile is to be fastened to the automobile's frame.

21 Claims, 1 Drawing Sheet

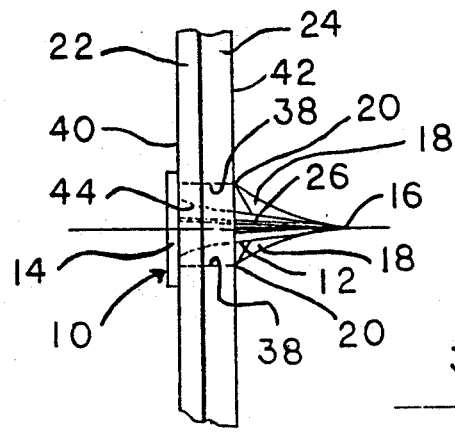
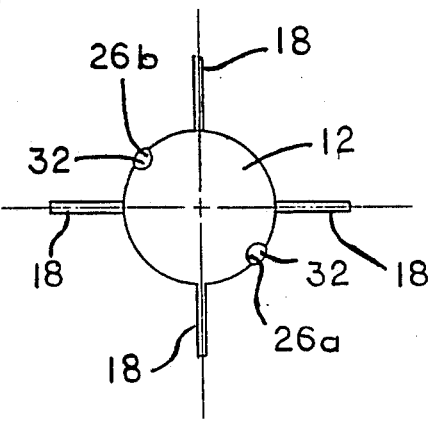
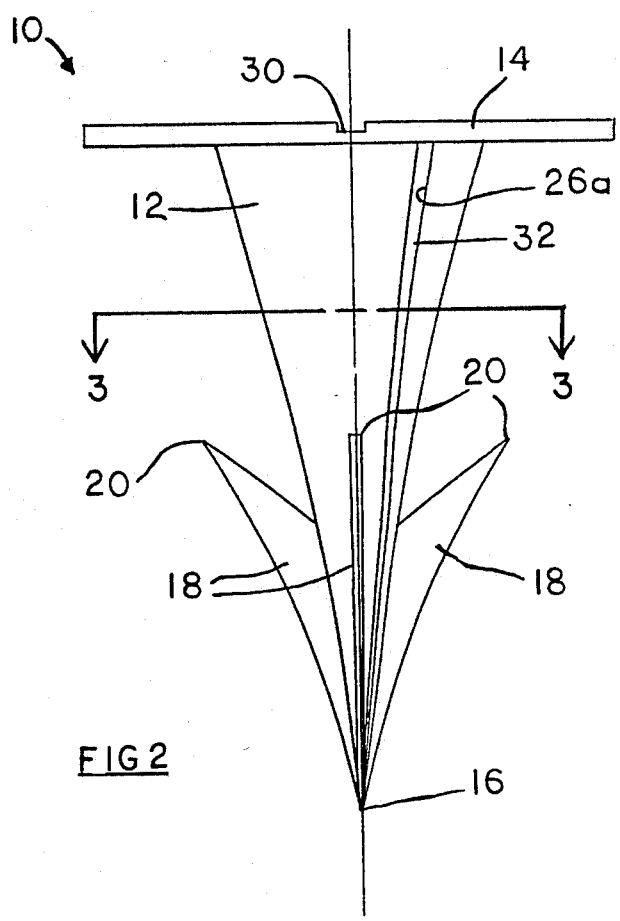
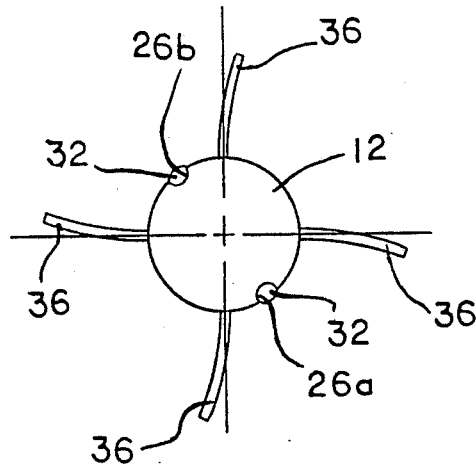

PIERCING FASTENER WITH ADHESIVE

BACKGROUND OF THE INVENTION

1. Field of the Invention

The present invention generally relates to fasteners, and more specifically, to mechanical fasteners suitable for permanently joining two or more panels together. The present invention also encompasses a method for permanently joining two or more panels using the fastener of the present invention in which an adhesive is used to permanently bond the fastener and panels together.

2. Description of the Prior Art

Numerous varieties of fasteners have been developed in response to the diversity of applications for which fasteners can be used. As manufacturing processes become more automated, there has been an increased emphasis on developing fasteners which simplify and facilitate assembly while simultaneously requiring that the fastener is capable of reliably securing the particular members being joined.

The particular type of fastener suitable for a given task is heavily dependent upon the characteristics of the structures being joined, such as their relative thicknesses and materials, and whether the joining is intended to be permanent or temporary. Conventionally, where a threaded fastener is used to join one member to another having a blind threaded hole, a self-locking fastener is often used. A self-locking fastener typically employs a plastic insert deposited in or on the threads of the fastener. The plastic insert increases the torque required to remove the fastener, yet provides a fastener that can be installed in a conventional manner. However, such self-locking fasteners are generally not suitable for joining thin members such as panels, nor are they considered a permanent fastener.

In contrast, rivets are a widely used type of permanent fastener for joining panels under conditions where disassembly is not anticipated, such as automotive door, body side, and undercarriage assemblies. Though suitable for many applications including joining either plastic or metal panels, rivets are not suitable for joining relatively thick members. Even when joining panels having a suitable thickness, the use of a standard (tubular) rivet is not generally feasible unless both sides of the joined panels are accessible so that a head, or clinch, can be formed on the rivet's shank opposite the rivet's preformed head.

With the development of modern adhesives such as epoxies and anaerobics, permanent retention of a threaded fastener in a bore can be achieved. An example of this approach is illustrated in U.S. Pat. No. 4,712,957 to Edwards et al. which teaches the use of a steel or aluminum fastener used to join a first member having a pre-drilled through hole with a second member having a pre-drilled blind hole. The shank of the fastener is shown to be either threaded or knurled with circumferential ridges. In addition, a number of longitudinal grooves are cut into the shank of the fastener. The grooves allow the forcible injection of a fluid adhesive into the blind hole while the fastener is partially inserted into the hole. As the fastener is further inserted into the hole, the adhesive fills the interstices between the fastener and the hole to achieve a secure bond. Consequently, the fastener is substantially more difficult to remove than it is to install. However, such a fastening system is unsuitable for joining panels where it is impracticable to provide a blind hole in the second member.

For joining thin members such as panels, both plastic and metal, various approaches have been suggested which often employ some form of barb. Barbs have long been used to prevent the removal of fasteners from the substrate in which they are embedded, as illustrated by the barbed nail taught by U.S. Pat. No. 1,918,936 to Shearman. However, the barb taught by Shearman is unsuitable for joining panels in that the barbs must become fully embedded in the members being joined to be functional. Similarly, U.S. Pat. No. 4,636,124 to Gugle et al. teaches a friction weld-type fastener having a pair of resilient wings which act to engage the interior surface of a bore into which the shank of the fastener is inserted. The frictional retention provided thereby offers a durable joining method in which it is possible to remove the fastener from the bore, though permanent damage to the resilient wings may result due to the fastener's plastic construction. The reliance on frictional retention also may result in loosening and/or rattles due to vibration. Again, the fastener taught by Gugle et al. is limited to use in a pre-drilled bore in thick members other than panels.

Variations on the resilient wings taught by Gugle et al. have found use in joining panels, such as the fasteners taught by U.S. Pat. No. 4,728,238 to Chisolm et al. and U.S. Pat. No. 4,551,189 to Peterson. Chisolm et al. teach a plastic fastener having numerous resilient wings extending obliquely from the fastener's shank. The wings allow the insertion of the fastener into a hole or bore with relative ease, while providing significantly greater resistance to the fastener's removal from the bore or hole. The fastener also overcomes one shortcoming of tubular rivets in that access to both sides of the joined panels is not required for assembly. However, the fastener is limited in its use in that it is formed from relatively weak plastic material and must be used with pre-drilled holes. Peterson illustrates a similar wing-type fastener of the type taught in U.S. Pat. No. 4,392,278 to Mugglestone.

From the above discussion, it can be readily appreciated that the prior art does not disclose a permanent fastener which is capable of joining two or more panels without access to both sides of the panels. Nor does the prior art teach or suggest a method which allows for the use of standard tooling to install such a fastener without the need for pre-drilled holes.

Accordingly, what is needed is a cost-efficient fastener for permanently joining two or more panels, such as automotive door, body side, and undercarriage assemblies, having as one feature the ability to form its own hole through the panels being joined, wherein access to the back side of the last panel is not required for the joining operation, and having the added benefit of providing a stable adhesive joint which will prevent rattles and squeaks between the panels.

SUMMARY OF THE INVENTION

According to the present invention there is provided a permanent fastener suitable for joining two or more plastic or metal panels under automated manufacturing conditions. The fastener is designed to form its own hole through the panels so as to avoid the need for a pre-drilled hole. Furthermore, the fastener is provided with a piercing point which enables the fastener to forcibly pierce the panels using conventional impact devices. The fastener is particularly adapted for permanently joining two or more panels where access to both sides of the joined panels is either impracticable or undesirable, such as when a body panel of an automobile is to be fastened to the automobile's frame or sub-frame. Finally, the fastener incorporates an adhesive which serves to adhere the fastener to the panels in a manner that prevents both rotation and axial displacement of the fastener relative to the panels.

The fastener has a shank with a head formed at one end and a piercing point formed at its opposite end. The head is preferably formed to receive a tool, such as a screw driver or socket wrench, for rotating the fastener. Disposed near the piercing point of the shank are one or more rigid barbs which extend obliquely from the shank toward the head of the fastener. Preferably, at least two barbs are positioned uniformly around the circumference of the shank to balance their effect upon the fastener as it penetrates the panels.

A groove extends generally longitudinally along a predetermined length of the shank, and preferably the entire length of the shank. In a preferred embodiment, a pair of grooves are formed diametrically opposite to each other along the length of the shank. Each groove contains an adhesive compound which is applied in a sufficient quantity to project above the circumference of the shank. The adhesive is preferably of the type which is cured by heat or ultraviolet rays, such as an epoxy adhesive.

According to a preferred aspect of this invention, the fastener is formed from a sufficiently strong material, such as SAE 1010 steel, such that the fastener can be forced through either metal or plastic panels without first providing a pre-drilled hole. The fastener is adapted to penetrate the panels through the application of a force applied to the fastener's head by any suitable means, such as a nail gun, hammer or ram. The preferred fastener material will depend upon the material used to form the panels, with stronger materials, such as hardened steel, being necessary for thick metal panels. The primary criterion is to avoid significant structural damage to either the head, piercing point or barbs while the fastener penetrates the panels.

Moreover, using properly adapted equipment such as a nail gun, the fastener can penetrate the panels from one side without requiring access to the opposite side to secure the fastener in the panels. The fastener is appropriately sized to provide a slight interference between the barbs and the rear surface of the last panel. By rotating the fastener with a suitable tool adapted to the particular form of the fastener's head, the barbs are indexed relative to their corresponding entry channels formed when the fastener was penetrating the panels. Indexing prevents the fastener from being removed from the panels without first realigning the barbs with their entry channels. As a result, there is no need for a retainer to be installed on the piercing end of the fastener, which, contrary to the teachings of the present invention, would require access to both sides of the panels to secure the fastener.

In addition, a significant advantage of the present invention is that the adhesive acts to permanently secure the fastener to the panels in a manner that prevents both rotation and axial displacement of the fastener relative to the panels. Consequently, the adhesive permanently secures the fastener in the indexed position to prevent the barbs from becoming realigned with their respective entry channels, while also actively bonding the fastener to the panels to provide a stronger permanent joint capable of eliminating rattles and squeaks. If the shear strength of the adhesive were to be exceeded in the axial direction, the panels would remain joined by the fastener because of the inability of the barbs to completely penetrate the panels in the reverse direction.

Accordingly, it is an object of the present invention to provide a fastener which is particularly adapted to permanently join two or more panels in a manner that discourages rattles and squeaks.

It is a further object of the invention that the fastener be adapted to form its own hole through the panels such that a pre-drilled hole is not required.

It is still a further object of the invention that the fastener be provided with a piercing end and an oppositely disposed blunt head such that the fastener is installed by forcibly penetrating the panels with a force applied to the head through any suitable means.

It is another object of the invention that the fastener have one or more barbs which are located on the shank of the fastener such that, after the fastener has penetrated the panels, there is a slight interference between the barbs and the last panel to assist in retaining the fastener in the panels without requiring access to both sides of the joined panels.

It is yet another object of the invention that the fastener include one or more adhesive strips deposited in grooves to prevent the fastener from rotating relative to the panels once the adhesive has cured.

It is still another object of the invention that the adhesive be located on the fastener such that the fastener is firmly bonded to the panels to resist axial displacement of the fastener relative to the panels.

Other objects and advantages of this invention will be more apparent after a reading of the following detailed description taken in conjunction with the drawings provided.

BRIEF DESCRIPTION OF THE DRAWINGS

FIG. 1 is a side view of a fastener in accordance with the present invention wherein the fastener has penetrated a pair of panels to be joined;

FIG. 2 is a side view of the fastener;

FIG. 3 is a cross-sectional view of the fastener taken along line 3—3 of FIG. 2 in accordance with a first embodiment of the present invention; and FIG. 4 is a cross-sectional view of the fastener in accordance with a second embodiment of the present invention.

DETAILED DESCRIPTION OF THE PREFERRED EMBODIMENT

With reference to FIG. 1, the present invention is a fastener 10 adapted to join two or more panels 22 and 24 together in a manner which is advantageous for use in manufacturing. The fastener 10 is capable of forming its own passage 44 through the panels 22 and 24, whether metal or plastic, so as to eliminate the need for pre-drilled holes. Furthermore, the fastener 10 is capable of joining the panels 22 and 24 from the near side 40 of the first panel 22 without the need to have access to the back side 42 of the last panel 24.

With reference to FIG. 2, the fastener 10 includes a shank 12 provided with a piercing end 16 formed at one end thereof which enables the fastener 10 to forcibly penetrate the panels 22 and 24 using any suitable impact device, such as a hand-held hammer or a nail gun (not shown). For this purpose, a head 14 is formed at the end of the fastener 10 opposite the piercing end 16. The head 14 is formed to receive a tool, such as a screw driver or socket wrench (not shown), for rotating the fastener 10 for a purpose to be explained below. This feature is shown as a slot 30 in FIG. 2 for illustrative purposes only. The shank 12 preferably tapers toward the piercing end 16, as best seen in FIG. 2.

Because of the high axial loads exerted upon the fastener 10, the typical material for the fastener 10 may be a conventional SAE 1010 steel or any other suitably strong material. The preferred fastener material for a particular application will depend upon the type of material from which the panels 22 and 24 are formed, with stronger hardened materials being necessary for metal panels while weaker materials will be suitable for joining plastic panels. Of primary concern is the avoidance of significant structural damage while the fastener 10 is penetrating the panels 22 and 24.

Formed adjacent the piercing end 16 are one or more, and preferably four, rigid barbs 18. The barbs 18 extend obliquely from the shank 12 with each of their points 20 projecting toward the head 14 of the fastener 10. As best seen in FIG. 3, the barbs 18 are preferably located equidistantly and uniformly around the circumference of the shank 12 to balance their effects upon the fastener 10 as it is being driven into the panels 22 and 24. As can be seen in FIG. 1, the barbs 18 are located longitudinally on the shank 12 such that the barbs 18 do not entirely clear the back side 42 of the last panel 24 so as to provide a slight interference between the points 20 and the last panel 24, particularly if the fastener 10 is rotated after penetrating the panels 22 and 24. The interference fit assists in the retention of the fastener 10 to the panels 22 and 24 without requiring access to the back side 42 of the last panel 24. Also as shown, the diameter defined by the points 20 of the barbs 18 is less than the diameter of the head 14, though suitable results can be obtained with the diameter of the points 20 being greater or significantly smaller than the diameter of the head 14, depending upon the material from which the panels 22 and 24 are made.

A pair of grooves 26a and 26b extend generally longitudinally along a predetermined length of the shank 12, and preferably the entire length of the shank 12. Each groove 26a and 26b contains an adhesive compound 32 which projects beyond the circumference of the shank 12. This oversized condition ensures that the adhesive 32 will have sufficient contact with the passage 44 formed by the fastener 10 through the panels 22 and 24 to promote a better bond between the shank 12 and the panels 22 and 24.

The adhesive 32 is preferably of the type which is cured by heat, such as an epoxy. In the preferred embodiment, the adhesive 32 is applied to the shank 12 using a dipping process that leaves a uniform deposit on the entire length of the shank 12 with an excess bead forming in the grooves 26a and 26b. Also in the preferred embodiment, the grooves 26a and 26b are formed diametrically opposite each other along the length of the shank 12 to promote uniform distribution of the adhesive 32. Adequate distribution of the adhesive 32 along the length of the shank 12 ensures that the fastener 10 will be sufficiently bonded to the panels 22 and 24 to prevent both rotational and axial displacement of the fastener 10 relative to the panels 22 and 24 after the fastener is driven into the panels.

With the use of the adhesive 32, the fastener 10 of the present invention is particularly adapted for permanently joining the panels 22 and 24 where access to both sides (near and back sides 40 and 42) of the joined panels 22 and 24 is either impracticable or undesirable, such as when the first panel 22 is a body panel of an automobile (not shown) which is to be fastened to the frame (the second panel 24) of the automobile. Accordingly, access to only the near side 40 of the first panel 22 is required, and no additional retainers or clips are necessary at the piercing end 16 to secure the fastener 10 to the panels 22 and 24.

In practice, the piercing end 16 of the fastener 10 is placed against the near side 40 of the first panel 22. A cyclic impact or continuous force is then applied to the head 14 of the fastener 10 to force the fastener 10 to penetrate the panels 22 and 24 until the head 14 abuts the near side 40 of the first panel 22 and the barbs 18 protrude beyond the last panel 24 with a slight interference with its back side 42. During this process, the piercing end 16 of the shank 12 forms the passage 44 through the panels 22 and 24 and the barbs 18 each form an entry channel 38 which are contiguous with and extend radially from the passage 44 formed by the shank 12. Simultaneously, the adhesive 32 becomes situated between the full length of the passage 44 and the shank 12.

After the head 14 is firmly abutted against the near side 40, the fastener 10 is rotated using the slot 30 or other suitable feature formed in the head 14 until the barbs 18 are misaligned with their entry channels 38 formed in the panels 22 and 24. With the use of some nail guns, a slight rotation to the fastener 10 will be automatically imparted to index the fastener 10 at the end of the penetration stroke, thus eliminating the need for the slot 30 or any other feature designed to receive a tool. Once indexed, the fastener 10 can no longer be removed from the panels 22 and 24 since realigning the barbs 18 with their entry channels 38 would be impractical. The interference fit between the points 20 of the barbs 18 and the back side 42 of the last panel 24 not only creates a tight joint between the panels 22 and 24, but also acts to resist any attempt to realign the barbs 18 with their entry channels 38.

After a proper curing of the adhesive 32, such as by heating the fastener 10 and panels 22 and 24 if a heat-curing adhesive is used in a subsequent operation, the adhesive 32 also acts to prevent the fastener 10 from rotating to realign the barbs 18 with their entry channels 38. Furthermore, the adhesive 32 distributed along the passage 44 through the panels 22 and 24 and the fastener 10 prevents axial displacement of the fastener 10 relative to the panels 22 and 24, thus discouraging rattles and squeaks between the panels 22 and 24. As an added safety feature, if the shear strength of the adhesive 32 were to be exceeded in the axial direction, the panels 22 and 24 would remain joined by the fastener 10 because of the inability of the barbs 18 to penetrate through the panels 22 and 24 in the reverse direction.

In a second embodiment shown in FIG. 4, the barbs are spiral barbs 36 having a slightly curved or spiral form to twist the fastener 10 through the panels 22 and 24 for better engagement. The spiral barbs 36 allow the fastener 10 to be rotated in only one direction (clockwise as illustrated) due to the interference fit between the points 20 and the back side 42 of the last panel 24. Any attempt to turn the fastener 10 in the opposite direction would act to engage the points 20 of the spiral barbs 36 into the back side 42 of the last panel 24, thus preventing rotation. As noted above, some nail guns will automatically impart a slight rotation to the fastener 10 to achieve the desired indexing of the fastener 10. However, it is worth noting that indexing a fastener 10 provided with the spiral barbs 36 may not be required in that the spiral barbs 36 would be more likely to resist passing through their entry channels 38 in the reverse direction.

Accordingly, a significant advantage of the fastener 10 of the present invention is that the fastener 10 is formed from a sufficiently strong material such that the fastener 10 can be forced through the panels 22 and 24 without first providing pre-drilled holes in the panels 22 and 24.

Another significant advantage of the present invention is that, using properly adapted equipment such as a nail gun, the fastener 10 can be used to join the panels 22 and 24 from the near side 40 of the first panel 22 without requiring access to the back side 42 of the last panel 24. By rotating the fastener 10, an interference is created between the barbs 18 (or spiral barbs 36) and the back side 42 of the last panel 24 to mechanically join the panels 22 and 24 together. In addition, in the preferred embodiment the barbs 18 or spiral barbs 36 are indexed relative to their corresponding entry channels 38 to prevent the fastener 10 from being removed from the panels 22 and 24 without first realigning the barbs 18 with the entry channels 38. As a result, there is no need for a retainer to be installed on the piercing end 16 of the fastener 10, which would otherwise require access to both the near and back sides 40 and 42 of the panels 22 and 24, to secure the fastener 10 to the panels 22 and 24.

In addition, a significant advantage of the present invention is that the adhesive 32 acts to secure the fastener 10 to the panels 22 and 24 in a manner which prevents both rotation and axial displacement of the fastener 10 relative to the panels 22 and 24. Consequently, the adhesive 32 secures the fastener 10 in the indexed position to prevent the barbs 18 or spiraled barbs 36 from becoming realigned with their respective entry channels 38, while also bonding the fastener 10 to the panels 22 and 24 to prevent displacement of the panels 22 and 24 in the axial direction of the fastener 10. As a result, rattles and squeaks are much less likely to occur in the final assembled product.

While the invention has been described in terms of a preferred embodiment, it is apparent that other forms could be adopted by one skilled in the art. As an example, more than two strips of adhesive 32 could be used, or the adhesive 32 could be located on the shank 12 of the fastener in other than the longitudinal orientation shown in the figures. Moreover, a different location or number of barbs 18 or spiral barbs 36 could be used without significantly altering the operation or performance of the fastener 10 or the function of the barbs 18 and 36. Accordingly, the scope of the invention is to be limited only by the following claims.

What is claimed is:

1. A fastener comprising:
   a shank having a longitudinal axis;
   a head disposed at one end of said shank;
   piercing means disposed at an opposite end of said shank;
   a plurality of barbs disposed on said opposite end of said shank, said plurality of barbs projecting in a direction away from said longitudinal axis of said shank;
   a groove extending along said shank; and
   an adhesive disposed in said groove.

2. The fastener of claim 1 wherein said groove extends longitudinally along said shank.

3. The fastener of claim 1 wherein each of said plurality of barbs also extends arcuately from said shank relative to said longitudinal axis.

4. The fastener of claim 1 further comprising a second groove extending along said shank, said second groove having an adhesive disposed therein.

5. The fastener of claim 4 wherein said groove and said second groove extend longitudinally along said shank, said second groove diametrically opposing said groove.

6. The fastener of claim 1 wherein said adhesive is a heat-curable adhesive.

7. The fastener of claim 1 wherein said shank is tapered toward said opposite end of said shank.

8. The fastener of claim 1 further comprising means formed in said head by which said fastener can be rotated.

9. A fastener for joining at least two panels, said fastener comprising:
   a shank having a piercing end formed at one end thereof;
   a head disposed at an opposite end of said shank, said head having means for rotating said fastener, said rotating means being formed in said head of said fastener;
   at least one barb formed on said shank adjacent said piercing end of said shank;
   a groove extending along said shank; and
   an adhesive disposed in said groove.

10. The fastener of claim 9 wherein said groove extends longitudinally along said shank.

11. The fastener of claim 9 further comprising a second groove extending along said shank, said second groove having an adhesive disposed therein.

12. The fastener of claim 11 wherein said groove and said second groove extend longitudinally along said shank, said second groove diametrically opposing said groove.

13. The fastener of claim 9 wherein said adhesive is a heat-curable adhesive.

14. The fastener of claim 9 wherein said shank is tapered toward said piercing end of said shank.

15. The fastener of claim 9 wherein said at least one barb is a plurality of rigid barbs disposed uniformly about and projecting obliquely from said shank.

16. The fastener of claim 15 wherein said shank defines a longitudinal axis and wherein each of said plurality of rigid barbs extends arcuately from said shank relative to said longitudinal axis.

17. A method for joining at least two members together with a fastener having a head at one end and an oppositely disposed piercing end, at least one oblique member disposed adjacent said piercing end, and an adhesive deposited in a groove formed in said fastener, said method comprising the steps of:
   driving said fastener, said piercing end first, into a first member of said at least two members until said head of said fastener abuts said first member and said at least one oblique member projects through each of said at least two members so as to create an interference with a last of said at least two members, said at least one oblique member forming a channel in said at least two members; and
   curing said adhesive so as to cohesively join said fastener with said at least two members.

18. The method of claim 17 further comprising the step of rotating said fastener so as to index said at least one oblique member relative to said channel prior to said curing step.

19. The method of claim 17 wherein said step of driving said fastener includes rotating said fastener as said fastener penetrates said at least two members.

20. The method of claim 17 wherein said step of driving said fastener includes said at least one oblique member inducing said fastener to rotate as said fastener penetrates said at least two members.

21. The method of claim 17 wherein said step of curing said adhesive includes heating said fastener to a sufficient temperature to heat cure said adhesive.

* * * * *